United States Patent [19]

Shah et al.

[11] 3,801,280
[45] Apr. 2, 1974

[54] SOLUBILITY-DISSOLUTION TEST APPARATUS AND METHOD
[75] Inventors: Ashok C. Shah, Portage; Craig B. Peot, Kalamazoo, both of Mich.
[73] Assignee: The Upjohn Company, Kalamazoo, Mich.
[22] Filed: Nov. 11, 1971
[21] Appl. No.: 197,761

[52] U.S. Cl. .......... 23/230 R, 23/230 B, 23/253 R, 23/259, 23/267 R, 23/272.6 R, 210/77, 210/359
[51] Int. Cl... B01d 33/00, B01n 33/00, B01n 33/16
[58] Field of Search .......... 23/230 R, 230 B, 253 R, 23/259; 210/77, 359

[56] References Cited
UNITED STATES PATENTS
| | | | |
|---|---|---|---|
| 3,241,675 | 3/1966 | Pashaian et al.............. | 210/77 X |
| 3,396,103 | 8/1968 | Huntington................. | 210/23 |
| 3,545,864 | 12/1970 | Dibbern..................... | 23/259 X |
| 3,684,448 | 8/1972 | Stricker..................... | 23/230 B |

OTHER PUBLICATIONS
L. C. Schroeter et al., Automated Dissolution Rate Studies of Capsules and Tablets, Jour. of Pharmaceutical Sciences, Vol. 51, No. 10, pp. 957–962 (October, 1962).

Primary Examiner—Joseph Scovronek
Attorney, Agent, or Firm—Woodhams, Blanchard and Flynn

[57] ABSTRACT

Apparatus and method for measuring the dissolution rate of a solid material. A container is provided for a solvent and a preforated chamber for the solid material is positioned within said container. A rotatable hollow filter is also located within said container and means are provided for effecting rotation thereof. Said rotation performs the double function of keeping the filter screen clear of solid particles and agitating the solvent. Pumping means draw the material-containing solution from within said hollow filter and convey it to suitable means for measuring the concentration of solute in the solvent, such as spectrographic measuring means. The material-containing solution may then be returned to said container.

20 Claims, 5 Drawing Figures

SOLUBILITY-DISSOLUTION TEST APPARATUS AND METHOD

FIELD OF THE INVENTION

This invention relates to apparatus for measuring the rate at which a soluble material is dissolved by a solvent and relates particularly to means for exposing the solid material to a solvent in a closed circulatory system. A hollow rotating filter is provided for both agitating the solvent with respect to the solute and continuously filtering the material bearing solvent together with means, preferably of continuously operating nature, for measuring the concentration of such material in the solvent as same passes through said closed circulatory system.

BACKGROUND OF THE INVENTION

In the research with respect to, and the manufacturing of, biologically relates products, such as pharmaceutical products, it has long been recognized that the rate at which a solid material will dissolve in a suitable solvent is a useful tool for determining certain critical characteristics of the products. For example, the rate at which a capsule or tablet dissolves in the gastrointestinal tract of the user will determine, or at least have a strong effect upon, the rate at which the active ingredients thereof will enter the bloodstream of the user. Hence proper control of such dissolution rate is important in both the design and the manufacturing of such capsule or tablet in order to insure the proper results from the product. Further, recent experimentation has shown the existence of a strong likelihood that the rate of in vitro dissolution of a pharmaceutical product is at least a somewhat significant indicator of the in vivo activity of said product after it enters the bloodstream of the user.

In view of these and other recognized uses which can be made of the rate of dissolution of a solid, many devices have previously been suggested for effecting such dissolution under controlled and repeatable conditions but none of them insofar as I am aware have been fully satisfactory. Some of them, utilizing agitation, are confined to only one agitation condition, and in addition they also produce erratic turbulent solvent agitation, for example if the official N.F. XIII dissolution method No. 2. Still other types utilize movement, such as rotation of the porous basket in which the solid is located, as described in the Official U.S.P. XVIII dissolution method. Such devices cause major obstacles in accurate dissolution rate determination. These obstacles include first, plugging of the holes of the porous basket with solid particles and second, mechanical abrasion and wear of the solid by its continuous impacts with the basket surface.

Although filters have been used in prior automated systems, they have not been efficient. Continuous filteration under positive pump pressure has caused clogging of the filter element. Use of coarse filters has alleviated this problem somewhat, and in consequence, the filters in most prior devices have used a corase filter element. But this results in inefficient filteration with fine particles escaping through the filter, which can produce significant error in the dissolution results because of the interference of the particles in the spectral or other analysis of the dissolved concentration of the material.

Accordingly, the purposes of the invention include:

1. To provide apparatus for effecting the dissolving of a solid material into a solvent at a controlled uniform and repeatable rate, for withdrawing material-carrying solvent free from entrained particles of the solute on a continuous basis, for delivering same to a testing site and for thereupon either returning same as desired to the main body of the solvent or discharging same elsewhere as appropriate and/or continuously replacing the withdrawn amount of material carrying solvent with fresh solvent.

2. To provide apparatus as aforesaid wherein, as an alternate to continuous solvent withdrawal, solvent aliquots may be withdrawn intermittently.

3. To provide apparatus as aforesaid in which the solvent is caused to pass through the solute at a substantially uniform rate and with a reasonably laminar flow characteristics (i.e., free of erratic agitation).

4. To provide apparatus as aforesaid in which the material-containing solvent is passed through a filter as same is withdrawn from the main body thereof.

5. To provide apparatus as aforesaid in which said filter is kept substantially clear throughout the testing procedure whereby the material-containing solvent can flow therethrough at a substantially constant rate.

6. To provide a device as aforesaid in which the material may be visually observed throughout the dissolving and testing procedure.

7. To provide a device as aforesaid which will be relatively simple both to build and to maintain and wherein the several components thereof may be readily modified and/or exchanged as needed to adapt the apparatus to varying test materials or procedures.

8. To provide apparatus as aforesaid in which the filter will be self-cleaning but without the necessity of utilizing scrapers, agitators or other independently operating mechanical devices for effecting cleaning thereof.

9. To provide apparatus as aforesaid which will be inexpensive yet effective, which will be free from delicate or precarious adjustments and which will operate accurately over a long period of time with a minimum of maintenance.

10. To provide apparatus as aforesaid capable of measuring dissolution of tablets, powders, capsules, suspension and such solids continuously as a function of time.

11. To provide apparatus as aforesaid capable of measuring total solubility and solubilization phenomena of solids as a function of time.

12. To provide apparatus as aforesaid in which all the experimental parameters can be adjusted (e.g., temperature, solvent agitation, continuous analysis system, etc.) prior to initiating dissolution of the solid, i.e., prior to the exposure of the solid to the solvent.

13. To provide apparatus as aforesaid which eliminates solid test sample abrasion and wear by mechanical impacts with its container surface, and allows maintenance of the "micro environment" within the solid pores and solid surface.

14. To provide apparatus as aforesaid which is useable for a wide variety of types of experiments involving solutes and solvents, in which the same piece of apparatus can be used for testing a substance at various stages of its development, e.g., in research for testing solubility of the substance in powder form, in development for determining formulation and predicting in vivo action from in vitro tests, and in production for quality control, whereby to achieve comparable tests results at all development stages.

Other objects and purposes of this invention will be apparent to persons acquainted with apparatus of this general type upon reading the following specification and inspecting the accompanying drawings.

SUMMARY OF THE INVENTION

Figure 1:
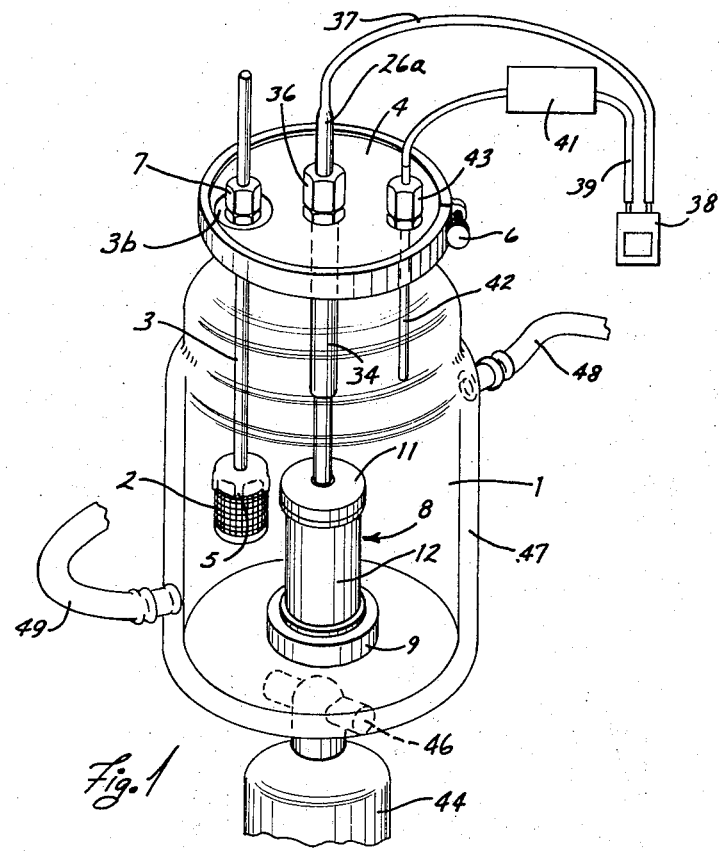
FIG. 1 is an oblique somewhat schematic view of apparatus embodying the invention.

In meeting the foregoing named objects and purposes the invention provides a container for containing the solvent and acting as a reservoir thereof. A perforated chamber, such as a wire basket, is positioned within said container for containing the solid material, such as a pharmaceutical tablet or capsule or other solid object. A hollow filter, such as one of cylindrical shape, is rotatably supported within said container preferably adjacent said chamber and means are provided for effecting rotation thereof. A withdrawal conduit leads from the interior of said filter to the exterior of the container and to suitable testing means and means are provided for causing a flow of solvent from within said filter through said withdrawal conduit. Preferably the testing means is a device, such as a spectrographic analyzer, operable on a continuous basis and likewise preferably the material-containing solvent, after passing the testing site, is returned to said container. In this manner the continuous testing means will provide a complete profile of the rate of dissolution of said solid material throughout the dissolving procedure.

The rotating filter simultaneously effects a gentle and uniform circulation of the solvent within the container and thereby causes a smooth, substantially laminar, flow of solvent through the solid material. Simultaneously the rotation of the filter causes same to keep itself clear from the accumulation thereof of particles in the solvent (which particles may be either undissolved solid material or inert material also present in the tablet) and thereby maintains the filter clean throughout the testing procedure which in turn assures a uniform, accurate, and repeatable testing operation.

DETAILED DESCRIPTION

Turning now to the apparatus herein chosen to illustrate the invention, it should first be observed that this invention was developed for the specific purpose of measuring the dissolution rate of pharmaceutical materials, particularly tablets, capsules, granules, etc., and hence for illustrative purposes same will be discussed in a context of such use. However, it will be recognized by those skilled in the art that this context is chosen solely for illustrative purposes and the apparatus of the invention is applicable in a wide variety of other possible uses, both within the pharmaceutical industry and elsewhere.

Turning now to the drawings there is shown a container 1 which in this instance is made of a transparent material such as glass but may be made of such other materials as appropriate to the solvent to be contained therein. A perforated container 2, such as a wire basket, provides a solute chamber and is positioned within the container 1 in any convenient manner, here by being suspended from rod 3. The basket 2 may be attached to and detached from the rod 3 by any convenient means, such as by utilizing snap tabs 5 to attach and detach the basket 2 to a cover 2a which latter is permanently fixed to the rod 3. In this instance, the solute chamber 2 is shown as located off center with respect to the container 1 and such, as appearing hereinafter, is advantageous in effecting a laminar flow of the solvent but may be modified as and if desired for other reasons or to serve other convenience.

The container 1 is provided in this embodiment with a detachable cover 4 which is mounted and fastened in a conventional manner such as by a clamp means 6 to the upper end of the container 1. However, since no pressure is maintained above the liquid in the container 1, said clamp structure 6 is intended more to secure rigidity and firmness in the structure than it is to establish a sealing relationship between the cover 4 and the container 1. Accordingly, if a seal is used between said cover and container it will be primarily to prevent loss of liquid by evaporation.

The rod 3 passes through a hole 3a in the detachable cover 4. The hole 3a is larger in diameter than the diameter of the container 2 and is closed by a removable circular disc 3b, which is supported therein by any convenient interference relationship with the edges of said hole, such as stepped, beveled, threaded or other. The disc is rigidly but adjustably mounted on the rod 3 at a desired height by appropriate clamp structure generally indicated at 7. This arrangement allows facile introduction of the basket 2 into container 1 without removal of the cover 4. It also suspends the basket 2 at a specified height in the container 1. The hole 3a may also be utilized to fill the container 1 with the solvent, and to remove all the liquid therefrom at the end of an experiment.

The filter 8 comprises a base 9, a top 11 and a cylindrical filter element 12 located therebetween. More specifically, the bottom 9 is, in this embodiment, of nonmagnetic material, such as plastic or ceramic, and has an elongated magnet 16 embedded therein for driving purposes as hereinafter discussed. Said bottom has an annular groove 17 in which is contained a cushioning and sealing ring 18. The cylindrical filter element 12 is of known materials, for example, glass fibers, porous ceramic or stainless steel impregnated porous ceramic. In the particular embodiment here used for illustrative purposes, the filter was made from a stainless steel impregnated porous ceramic having a porosity of 1 micron. The filter 12 is received into a suitable annular groove within the sealing strip 18.

The top 11 in this embodiment is integral with a core 19 which latter extends downwardly from said top 11, is spaced inwardly from the filter element 12 and is fastened, as by threaded means 21, with the bottom member 9. The underside of said top member 11 has an annular groove 22 therein, into which is received an annular seal and cushion member 23 and which in turn receives the upper end of the filter element 12. The core 19, which in this embodiment is made of glass-filled Teflon, has a central opening 24 for reception of the hereinafter further described central rod 26 and a spiral groove 27 extends around the central opening 24 and communicates at its upper end with an enlargement 28 of said central opening and communicates at its lower end into an enlargement 29 of said central opening 24. The upper enlargement 28 communicates by a passageway 31 with the annular space 32 between the filter 12 and central core 19. A simple seal 30 of any known type is positioned in a suitable recess 51 and both closes the upper end of the upper enlargement 28 and provides bearing guidance between the top 11 of the filter unit and the rod 26.

The rod 26 has a central opening 33 lengthwise therein and a head 35 at its lower end thereof, which head 35 bears against the downwardly facing surface of the lower enlargement 29 for supporting said central core 19 and thereby supporting the entire filter unit. The clearance between the rod 26 and the surface defining the internal opening 24 is such as to permit relative rotation therebetween but still to provide a firm and smooth guidance of the filter on and by the rod 26 so that same can rotate if desired at a relatively high rate of speed without vibration on or with respect to rod 26. With the rod 26 in place the spiral groove 27 comprises communication from the annular space 32 by way of the passageway 31 to the lower opening enlargement 29 and hence into the lower end of the central passageway 33 of the rod 26.

Figure 2:
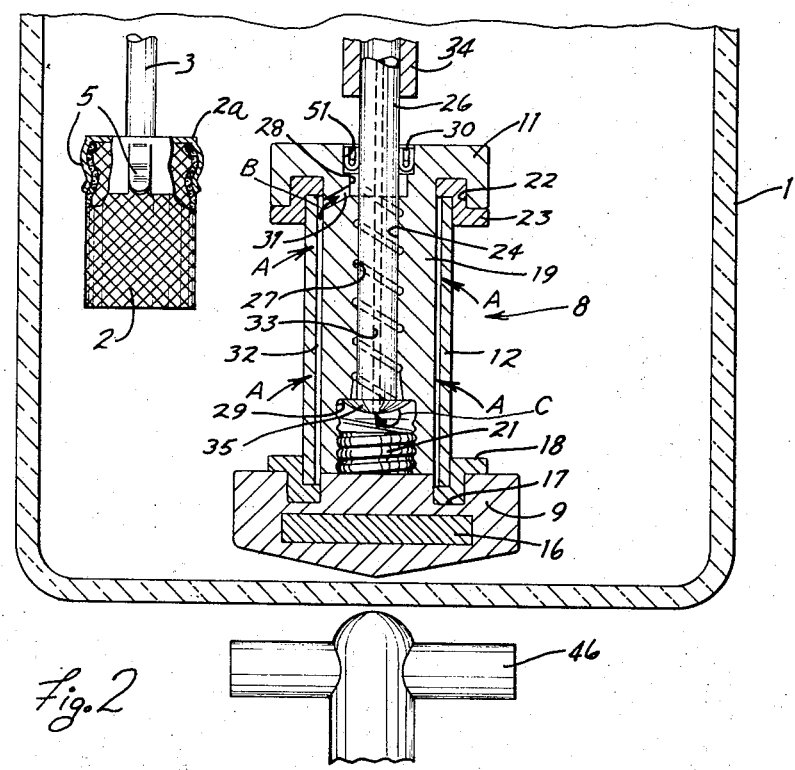
FIG. 2 is a partial central section of the apparatus shown in FIG. 1 with the sectional plane being taken centrally of the hereinafter described filter and material-carrying basket.

The upper end of said rod 26 is received into the suitable sleeve 34 which will be of suitable corrosion resistive material, such as stainless steel, and same is received sufficiently snugly that little or no liquid can pass therebetween. The sleeve 34 extends through a suitable opening in the cover 4 and is firmly fastened thereto by a suitable clamp 36. The filter 12 is substantially centrally located in the container 1 in FIGS. 1 and 2.

The rod 26 projects also from the upper end of the sleeve 34 and its upper end 26a is connected by a suitable hose or other conduit 37 to continuous analyzing means 38, such as a standard form of spectrophotometer which more particularly in one specific embodiment was a Beckmannn Model DBG recording spectrophotometer having a flow cell positioned inside the cell compartment. A further conduit 39 then extends from the measuring device 38 through suitable pumping means 41 and returns to the container 1, preferably through a return pipe 42 suitably clamped by clamp means 43 to the cover 4. The pump 41 may be of any convenient type, either a pump such as a gear pump made of materials which are inert to the liquid being handled in the system or a pump acting solely on the outside of flexible tubing whereby pumping action is obtained without contacting of the liquid by the pump elements.

A driving motor 44 is mounted below the container 1 and includes a rotating magnet 46 which in a presently known manner cooperates with a magnet 16 to effect rotation of the filter unit 12. The motor 44 will normally be of selectable speed in order that the rate of rotation of the filter can be properly chosen and controlled.

Where it is desired for temperature control, the container 1 may be jacketed as indicated at 47 with inlet and outlet conduits 48 and 49 respectively for the circulation therethrough of suitable temperature controlling liquid.

OPERATION

While the operation of the above-described apparatus has been somewhat indicated in the foregoing material, same will now be described in more detail to insure an understanding of same.

Starting with the parts assembled as shown in the drawings, the apparatus may be made ready for an experiment by loosening of the clamps 6 and removal of the cover 4. This removes as a single unit both the basket 2 and the filter assembly 12. If a new filter unit is to be used or one having a different porosity than that previously used is desired, the bottom member 9 may be unscrewed from the core 19 by relative rotary motion with respect thereto and the filter unit cleaned or replaced as desired. The bottom 9 is then replaced.

The cover 4 may then be replaced with the basket, the filter and the return tube 42 extending as shown into said container 1.

However, it is normally not necessary to remove cover 4 to ready the apparatus for an experiment, since the filter will not normally require attention. Indeed, to charge the basket 2 and container 1, it is preferred merely to lift the rod 3, with its attached basket 2 and disk 3b from the container 1, thus opening the hole 3a. The lower or mesh portion of the basket 2 is then unsnapped from the retaining cover 2a thereof and suitable material for testing, as one or more pharmaceutical tablets, is placed therein. The basket is then snapped back into position on its retaining cover, as shown. The desired amount of solvent is added to the container 1 through the hole 3a, said amount being at least enough to keep the filter 8 and basket 2 covered when liquid also fills the tubing 37 and 39, the analyzer 38 and the pump 41.

Thereafter, the agitation and all other experimental conditions can be adjusted. For example, the container 1 is suitably mounted (in a manner not shown) above the motor 44 and connected appropriately to the tubing both for connecting same to the analyzer unit 38 and to the tubing 48 and 49 for temperature control purposes, if desired. The motor 44 is started at whatever speed has been determined as desired for the particular type of dissolution operation to be tested. This will effect through the magnet 16 rotation of the filter unit 8 at the speed desired in a given case.

The pump 41 is started and liquid is thus drawn from within the container through the filter unit 12 (as shown by arrows A in FIG. 2) into the annular space 32 thence through the passageway 31 (as shown by arrow B) to the spiral groove 27. As same flows down through the spiral groove it effects satisfactory lubrication between the rod 26 and the core 19. Liquid discharging from the bottom of groove 27 then flows into the central opening 33 of the rod 26 (as shown by arrow C) and upwardly into the sleeve 34 and thence to the testing unit 38.

If and as desired, suitable temperature control liquid may be passed through the jacket 47 by conduits 48 and 49 in order to maintain the solvent within the container 1 at the desired temperature, either above or below room temperature according to the requirements of the procedure being carried out. Finally, and preferably as the last step in preparation of the apparatus, the experiment is started by lowering the basket 5 with the solid sample in it, into the container 4. Whatever tests are desired at this point may then be performed, such as spectrographic analysis, as said liquid flows past a suitable window in the unit 38 and liquid then returns to the tube 42 and into the container 1.

Details of the testing procedure carried out in the testing unit 38 are not given inasmuch as same may be of any known type, which procedures are well known to those skilled in the art and may be freely chosen according to the particular kind of material being tested and the needs of the testing procedure.

While the rotating filter is, as here shown, preferably free from blades which would act as an impeller against the solvent within the container, nevertheless the rotation of the filter will act sufficiently by friction against the solvent to cause it to circulate around the container in a manner relatively free from agitation and hence it will flow through the basket 2 in a relatively laminar manner. In this manner, the filter unit is permitted to rotate at a relatively high rate of rotation, such as 400 r.p.m. in one typical case. This will keep the filter free from particles attaching themselves to the filter element 12, and yet the desirable laminar flow of the solvent through the basket 2 is not disturbed.

It is not clear whether the filter unit 12 remains unclogged by some kind of boundary layer phenomenon or whether particles, usually particles of remaining material from the basket 2 but sometimes particles of inert materials when same are present, are merely thrown off of the filter by the centrifugal force of the rotation thereof. Nevertheless, regardless of the particular mechanics involved, it has been definitely observed that the filter remains substantially clean throughout the testing procedure. For example:

EXAMPLE 1

In one specific test, the apparatus here described was employed for analyzing the dissolution rate of a slow dissolving anti-diabetic tablet for a period of about 200 minutes. The filter element remained unclogged throughout the test and as a result the fluid flow rate therethrough remained unchanged during the entire study. The examination of the flow cell at the end of the run did not show any accumulation of fine particles therein.

EXAMPLE 2

For comparative purposes another experiment was performed in which the dissolution rate of the same kind of tablets was investigated under conditions identical to the experiment above mentioned with the one exception that instead of utilizing the rotating filter above described the dissolution was filtered through 100 mesh stainless steel filter tube as described by Schroeter and Wagner, Journal of Pharmaceutical Science, Volume 51, page 957 (1962). In this case, the filter cloth was substantially clogged within 20 minutes and the fluid flow rate diminished from an initial 25 ml./min. to a rate of only 2 ml./min. Since this made it impossible to follow the dissolution rate for any longer period of time the test was terminated shortly thereafter.

Figure 3:
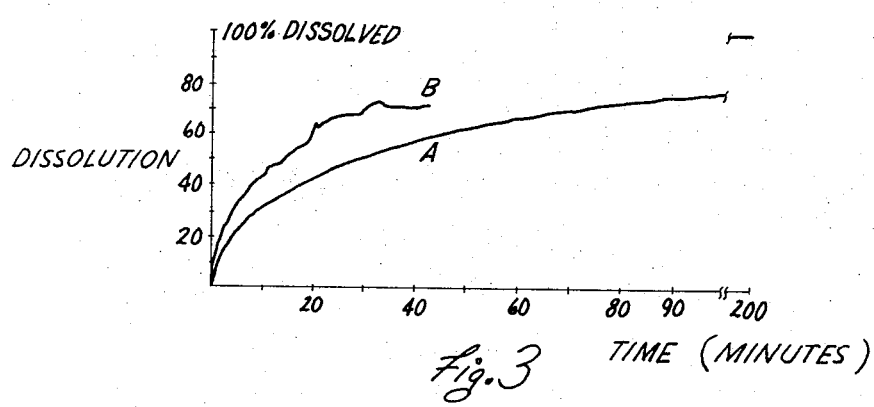
FIG. 3 is a graph illustrating the operation of the apparatus together with the operation of prior known devices for the same purposes.
Figure 4:
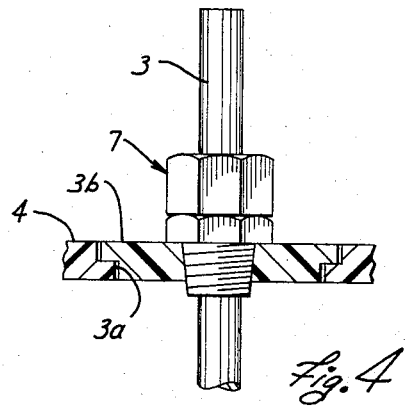
FIG. 4 is an enlarged central section of a portion of FIG. 1, taken on the sectional plane of FIG. 2.

The comparative dissolution rates for these two tests appears in FIG. 3, with a line A showing the dissolution rate for the Example 1 above described and the line B shows the dissolution rate for Example 2. The line B ends at 40 minutes inasmuch as the experiment was ended at that time.

A further advantage of the above-described apparatus is that, unlike the situation where paddles are used within the solvent, which paddles often operate closely adjacent, or sometimes in actual contact with the tablets being examined and unlike testing units wherein the sample holding basket is itself rotated, there is in the present system no abrasion or other mechanical deterioration of the test sample. This minimizes the particles of solid material which are free in the solvent and hence further minimizes the tendency of the filter to clog. It also minimizes the possibility that small particles capable of passing the filter will be carried through to the photometric device and disturb the accuracy of the measurements made thereby.

All the foregoing description has been on the assumption that the material will be continuously passed through the measuring device 38 and a continuous profile, such as shown in FIG. 3, created thereby and such is one of the major advantages of the apparatus herein described. Nevertheless, it will also be appreciated that if desired the measuring device 38 may be replaced by a suitable valve from which samples of the material-carrying solvent may be withdrawn from time to time as desired for batch analysis. Alternately, and more simply, the rod 3 may be withdrawn momentarily from the hole 3a to allow a sample of the liquid in the container 1 to be taken manually, as through use of a ladle or the like, not shown. This is particularly useful where material is being dissolved which does not lend itself readily to spectrographic analysis or where for other reasons samples of specific and individual amounts are desired. Hence the apparatus may be utilized for continuous or batch sampling.

Figure 5:
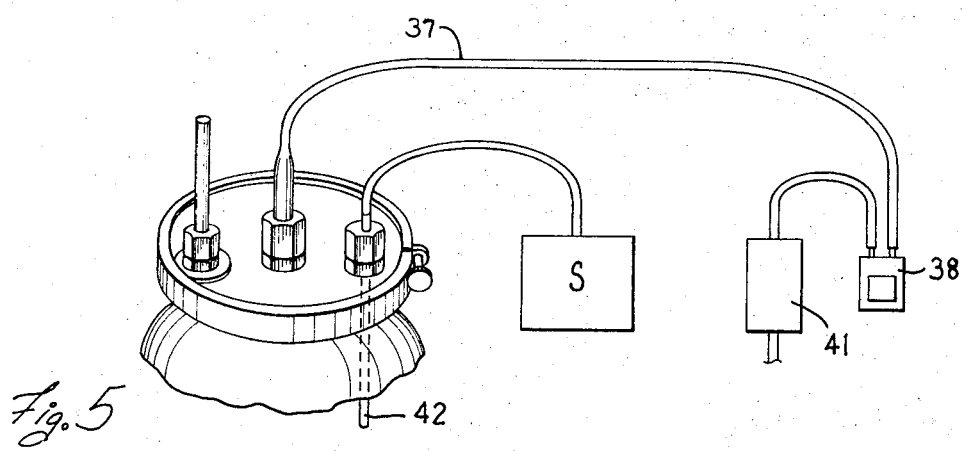
FIG. 5 is a modified fragment of FIG. 1.

The apparatus of the present invention is particularly useful for simulation of in vivo conditions to enable prediction of in vivo results, e.g., performance of a tablet or other substance in the human gastro intestinal tract, wherein fresh solvent inputs may maintain solute concentration well below saturation, e.g., a sink condition, without requiring a large solvent supply and container. To this end, and as shown in FIG. 5, solution taken from line 37 through the analyzer 38 by pump 41 may not be returned to the container 1 but rather, the liquid level in container 1 may be maintained by applying fresh solvent thereto from any convenient source S through line 42 at a desired rate, with the composition of liquid in the line 37 noted as desired by analyzer 38.

Several devices according to the present invention can be adjacently located with, for example, connection to a common source of temperature control liquid and the same filter rotation speed. The latter condition is preferably established by using a single motor 44 to drive several magnets 46, each corresponding to a respective one of the devices, as through a conventional chain drive or the like. Such use of multiple devices may be desired in a variety of situations, e.g., where dissolution rates for tablets of the same substance but with different degrees of compaction are to be determined and compared.

It will be recognized that the specific apparatus set forth herein has been chosen for illustrative purposes only and that other devices and applications of the devices embodying, and other applications utilizing, the principles set forth here are fully contemplated and included in the scope of the hereinafter pending claims excepting as the claims by their own terms may specify otherwise.

The embodiments of the invention in which an exclusive property or privilege is claimed are defined as follows:

1. Solubility-dissolution rate testing apparatus comprising in combination:
   a container for holding the solvent liquid;
   means holding a test sample fixedly and in contact with said liquid;
   a rotatable hollow filter in said liquid adjacent said sample holding means and means effecting rotation of said filter at a selected rate of rotation for circulating a substantially laminar flow of liquid through said sample holding means, whereby liquid is permitted to flow through the filter into the interior of said filter but such rotation prevents particles from remaining on the radially outer surface thereof;
   withdrawal means for withdrawing solvent with solute contained therein from within the interior of said filter and conveying same to the exterior of said container for testing.

2. The device of claim 1 wherein said filter is substantially cylindrical and rotates on its axis of symmetry and includes means defining a filter element which presents substantially circular transverse cross-sections throughout its axial length for frictionally engaging said liquid and thereby circulating said liquid smoothly through said sample holding means.

3. The device of claim 1 wherein said filter is substantially centrally located in said container to substantially uniformly circulate liquid around said container and the means holding the sample in a perforated basket positioned off center within said container at a point between the rotatable filter unit and the wall of the container to facilitate laminar flow of liquid therethrough.

4. The device of claim 1 including analyzing means for continuously monitoring and indicating the solute content of a solution passing therethrough and solvent conducting means for receiving solvent from within said rotatable filter through said withdrawal means during filter rotation, conducting same to and through said analyzing means and returning same to said container.

5. The device of claim 4 wherein said analyzing means is a spectrophotometer.

6. The device of claim 1 including valve means for withdrawing material-containing solvent from said withdrawal means for batch testing thereof.

7. The device of claim 1 wherein said filter includes a supporting rod having a withdrawal passageway therein, a generally cylindrically shaped filter element surrounding said rod and hollow core means interposed radially between said filter element and rod and supporting said filter, said core means being rotatable on and with respect to said rod, and passageway means for conducting liquid from said filter element to said withdrawal passageway within said supporting rod.

8. The device of claim 1 including a test sample comprising at least one solid body, said holding means being porous to permit liquid circulation past said sample, and wherein said filter is of circular cross-section and is supported for rotation about its axis of symmetry and said means effecting rotation includes a motor having a range of selectable speeds including speeds at which filter rotation imparts a gentle laminar agitation to said liquid to cause same to flow evenly and smoothly past said test sample.

9. The device of claim 1 wherein said means holding said test sample is fixedly located in said container but vertically adjustable with respect to said container and said rotatable filter and holds said sample fixed with respect to said container to avoid abrasion thereof and shedding of particles thereby.

10. The device of claim 1 including means connectable to a supply of fresh solvent for supplying fresh solvent to the container at a desired rate corresponding to the withdrawal rate of said withdrawal means and wherein in vitro testing can be carried out to simulate in vivo sample activity.

11. The device of claim 1 including a cover on said container, said withdrawal means including a sleeve extending substantially centrally through said cover and longitudinally adjustably fixed thereto for rotatably supporting said filter with respect thereto in said container,
   means defining an enlarged hole off center in said cover for addition to and removal from said container of said liquid and sample holding means without disturbing said cover and filter,
   a disk closingly engageable with said hole and vertically adjustably supporting said sample holding means in pendant relation therewith for fixedly locating said sample holding means with respect to the rotational axis of said filter.

12. The device of claim 1 including a cover on said container and having an opening therethrough, said means holding a test sample comprising a disk registerable with said opening for closing same, an elongate member pendant from said disk, and a perforate test sample receptacle secured to said elongate member remote from said disk, said opening in said cover being sized for free passage of said elongate member and sample receptacle therethrough into said container and for support of disk by said cover.

13. The device of claim 12 wherein the peripheral edges of said opening in said cover and of said disk are respectively provided with upwardly facing and downwardly facing beveled edges which are opposed for axially and radially locating said disk on said cover and including means adjustably axially locking said elongate member to said disk to govern the height of which the test sample is supported in said container.

14. A method for initiating solubility-dissolution testing:
   filling a container to a desired level with liquid comprising a solvent;
   immersing a closed hollow filter within said liquid in said container so that liquid enters the filter and imparting a laminar circulation to said liquid by rotating said filter with respect to said container;
   conducting liquid from within said filter through an analyzer device;
   returning liquid consisting at least in part of solvent to said container; and thereafter
   inserting into and substantially fixedly locating within said container, in contact with said circulating liquid therein and adjacent said rotating filter, a test sample to be dissolved in said liquid;

whereby at least the major testing conditions including liquid movement are established before introduction of the sample into the liquid and such introduction and fixed location of said sample into said circulating liquid initiates the test.

15. The device of claim 7 in which said hollow core means has a longitudinal opening, said rod being rotatably received in said longitudinal opening, said passageway means including a transverse passageway extending from said filter to said opening in said core means, and further including;

means defining a spiral groove between said core means and rod and extending from said transverse passageway along said rod into communication with said withdrawal passage in said rod for flowing filtered liquid therethrough and lubricating the relatively rotating portions of said core means and rod.

16. The device of claim 15 in which said longitudinal opening includes one radial enlargement at one end of said core means, said rod including a head in said one enlargement, and bearing on an end of said one enlargement to define a thrust bearing preventing movement of said core means off said rod, said withdrawal passage of said rod and spiral groove communicating through said one enlargement.

17. The device defined in claim 16 in which said one enlargement is internally threaded, said filter further including a base fixedly carrying a permanent magnet adapted to rotate said filter, said base abutting said core means and having an extension received in and threadedly engaging in said one enlargement of said core means.

18. The device of claim 17 in which said core means comprises a cylindrical core, a top on said cylindrical core extending radially outwardly thereof, said base abutting and extending radially beyond the bottom of said core, said base and top defining opposed annular grooves extending radially outboard of said core, annular cushion means in said annular grooves, said filter element being cylindrical and extending between said cushion means in close radial adjacency with said core, said core and filter element defining an annular liquid flow space therebetween communicating at one end with said transverse passageway.

19. The device of claim 15 in which said longitudinal opening includes an upper enlargement at the upper end of said core means, said upper enlargement communicating between said transverse passageway and said spiral groove, a seal recessed in the end of said upper enlargement in surrounding and sealing relation with said rod.

20. The device of claim 19 in which said longitudinal opening includes a lower enlargement at the lower end of said core means, said rod including a head in said lower enlargement and bearing on said core means, said rod supporting said core means for rotation thereon between said seal and head wherein filtered liquid flow through said spiral groove between said enlargements provides lubrication between said rod and rod head and the adjacent surfaces of said seal, longitudinal opening, and lower enlargement, said filter further including a base and means securing said base to the bottom of said core means for closing said lower enlargement.

* * * * *